(No Model.)
P. M. WIEBE.
SCREW THREAD CUTTING DEVICE.
No. 575,085. Patented Jan. 12, 1897.
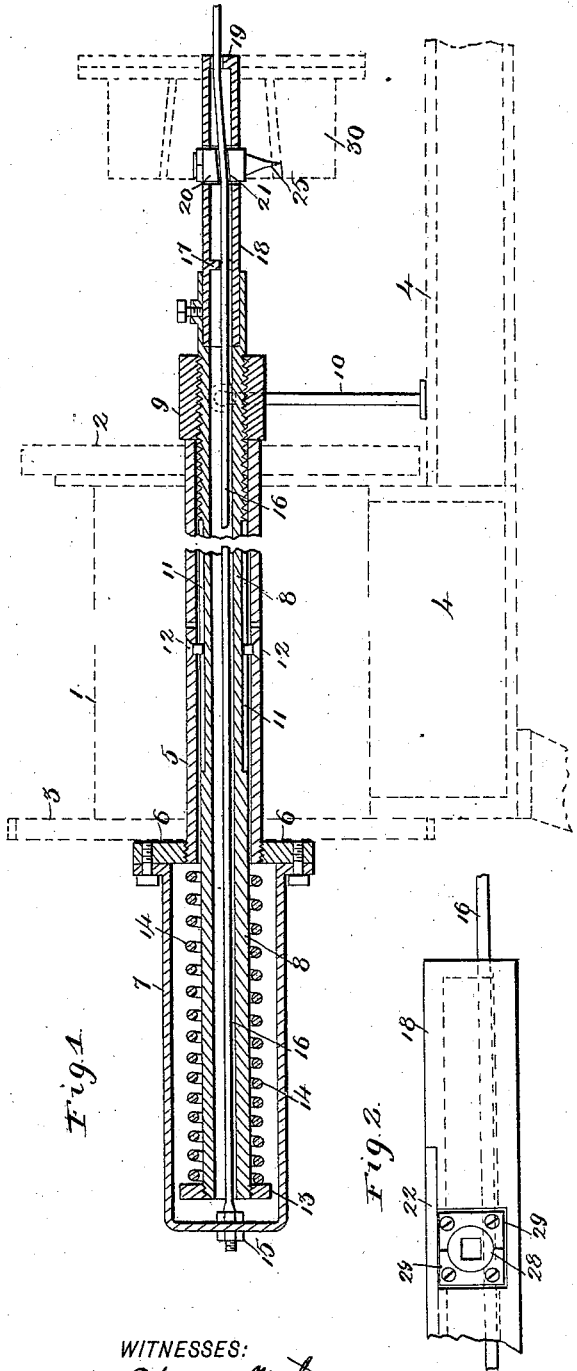
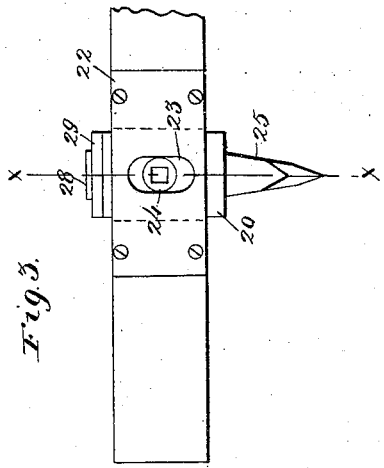
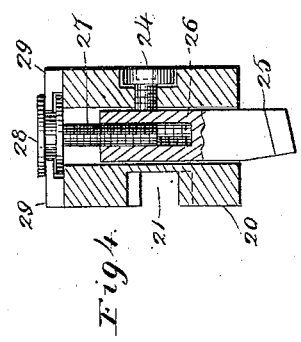
WITNESSES:
Alfred A. Mathey
H. B. Wells
INVENTOR
Paul M. Wiebe.
BY
Keller & Stonen
ATTORNEYS.

UNITED STATES PATENT OFFICE.

PAUL M. WIEBE, OF ST. LOUIS, MISSOURI.

SCREW-THREAD-CUTTING DEVICE.

SPECIFICATION forming part of Letters Patent No. 575,085, dated January 12, 1897.

Application filed April 11, 1896. Serial No. 587,187. (No model.)

*To all whom it may concern:*

Be it known that I, PAUL M. WIEBE, a citizen of the United States, residing at St. Louis, State of Missouri, have invented certain new and useful Improvements in Screw-Thread-Cutting Devices, of which the following is a full, clear, and exact description, reference being had to the accompanying drawings, forming a part hereof.

My invention has relation to improvements in screw-thread-cutting devices; and it consists in the novel arrangement and combination of parts, more fully set forth in the specification, and pointed out in the claims.

In the drawings, Figure 1 is a middle vertical longitudinal section taken through the cutting device. Fig. 2 is a top plan view of the tool-holder with the cutter in place. Fig. 3 is a side elevation of the tool-holder with cutter in place, and Fig. 4 is a section on the line *x x* of Fig. 3 of the block which supports the cutter.

The object of my invention is to construct a screw-thread-cutting device which is adapted to cut along either a tapering or cylindrical surface; one which is simple in construction, cheap, and durable; one which is positive in its action, reliable, and one which consists of a minimum number of parts for the character of work performed by it. In detail it may be described as follows:

Referring to the drawings, 1 represents a suitable rotating chuck or cylinder having a central or axial opening and terminal heads or disks 2 3, the latter being peripherally toothed and adapted to be driven from any suitable source of power. The stationary frame 4 and the rotating chuck mounted thereon are herein shown dotted, as these parts are old and form in no wise any part of my invention. Passing through the axial opening of the cylindrical chuck 1 and adapted to revolve with the chuck is a sleeve 5, having a disk 6 passed over the screw-threaded projecting end thereof and bearing against the outer surface of the disk or head 3. Bolted to the disk 6 is the open end of a cup 7, which is adapted to receive one end of a tube 8, which passes through the sleeve 5 and which projects outwardly a suitable distance from the opposite end of the sleeve.

A portion of the periphery of the tube 8 is screw-threaded, a suitable collar 9, carried by a standard 10, projecting from the frame 4, being adapted to receive the screw-threaded portion of the tube, the parts being so arranged as to cause the inner end of the collar 9 to bear against the adjacent end of the sleeve 5, projecting from the chuck. The tube 8 is adapted to move longitudinally through the sleeve 5 and at the same time to rotate with the latter, this being accomplished by providing the periphery of the tube with longitudinal grooves or slots 11, in which operate the inner ends of the pins 12, driven through the walls of the sleeve. The end of the tube 8 confined in the cup carries a terminal nut or head 13, between which and the disk 6 and encircling the tube is interposed a resilient coiled spring 14, normally tending to expand and hold the parts in the position indicated in Fig. 1.

Passing through the tube 8 and adapted to have one end firmly secured to the base of the cup by a tightening-bolt 15 is a guide-rod 16, the said rod passing first through an opening formed in the transverse partition or diaphragm 17 near the inner wall of the hollow tool-holder 18, inserted into and held by the projecting end of the tube 8. The rod 16 thence passes through an opening of the terminal wall 19 of the tool-holder, the opening of the wall 19 being out of alinement with the opening formed in the diaphragm 17, so as to give that portion of the rod 16 which guides the tool-supporting block 20 a slight inclination to the axis of the tool-holder, for a purpose to be presently explained.

That portion of the tool-holder which projects from the tube 8 is preferably oblong or rectangular in cross-section, the tool-supporting block 20 being inserted from the side wall of the tool-holder, the inclined groove 21 of the block being made to embrace the lower or inner end of the inclined section of the guide-rod 16.

When the tool-supporting block is in place, the side wall of the tool-holder, through the opening of which the block was inserted, is covered by a plate 22, having a central elongated slot or cut-away portion 23, through which can be operated (by any suitable tool)

a tightening-bolt 24, carried by the adjacent wall of the block 20, for tightly clamping the cutter or knife 25 after the latter has been properly adjusted within the block to the surface on which the threads are to be cut.

The shank of the cutter or knife is provided with a screw-threaded socket 26, into which an adjusting-bolt 27 is passed, the head 28 of the latter being provided with a peripheral groove adapted to receive the curved edges of the series of supporting-plates 29, secured to the top wall of the block 20. The head of the adjusting-bolt is thus directly supported and retained in place by the plates 29, and upon the turning of said bolt in one direction or the other the cutter or knife will be properly adjusted within the block 20 to a position to accurately set the knife against the surface of the pipe or die on which the threads are to be produced. In the present case a screw-cutting die 30 is shown with the cutter in position for recutting or sharpening the inclined or tapering threaded surface thereof.

The operation is as follows: Upon rotation of the chuck 1 and the sleeve 5 carried by it rotation is imparted to the tube 8; but as the latter operates within the stationary collar 9 the tube must necessarily travel forward or advance within the sleeve 5, the pins 12 serving to guide the tube in its longitudinal movement. The die so operated on is held stationary, so that the cutting tool or knife, as it is rotated and advanced by the tube 8, cuts the desired thread along the inner surface of the die. Of course with the rotation of the parts already referred to the cup 7 and rod 16 also rotate; but as one end of the latter is held rigid (being firmly secured to the base of the cup) the tool-supporting block 20 as it steadily advances is thus caused to travel along the inclined section of the rod 16, (the inclination of the section corresponding approximately to the inclination of the generatrix of the surface on which the threads are to be cut,) and thus accurately cut the threads on the inclined surface on which the threads are to be disposed. The forward travel of the tube 8 compresses the spring 14, which causes the parts to resume their normal positions after the die or pipe operated on is removed. When occasion arises to cut the threads along a cylindrical surface, (as in the case of pipes,) instead of inclined surfaces, as shown, the end of the rod 16, which is normally secured to the base of the cup 7, is loosened therefrom, whereby the tool-supporting block simply carries the rod with it as it advances without being obliged to travel along the inclined section of the rod secured against forward movement.

It is of course to be observed that the tool-supporting block 20 freely moves between the walls of the openings cut in the walls of the tool-holder in which the block is mounted.

Having described my invention, what I claim is—

1. In a screw-thread-cutting device, a suitable rotating sleeve, a tube loosely passed through the same and projecting a suitable distance therefrom, a tool carried by the projecting end of the tube, intermediate connections between the sleeve and tube for rotating the latter with the sleeve and simultaneously advancing the same and the tool carried by it, and means for restoring the tube to its normal or original position within the sleeve upon the completion of the cutting operation, substantially as set forth.

2. In a screw-thread-cutting device, a suitable rotating sleeve, a tube loosely passing through the same and projecting outwardly from each end thereof, a head carried by one of the projecting ends of the tube, a coiled spring encircling the tube and interposed between the head and the adjacent end of the sleeve, the opposite end of the tube having a peripheral screw-threaded portion, a stationary collar passed over the screw-threaded portion, a tool-holder carried by the tube exterior to the collar, a longitudinal groove or slit formed along the outer surface of the tube and located within the sleeve, and a pin carried by the sleeve, and coöperating within the groove of the tube, whereby upon rotation of the sleeve, the tube is rotated therewith and simultaneously advanced forward, substantially as set forth.

3. A screw-thread-cutting device comprising a rotating sleeve, a cup carried at one end of the same, a tube passing loosely through the sleeve and having one end projecting into said cup, a head carried by the end of the tube confined within the cup, a resilient coiled spring encircling the tube and interposed between the head and the adjacent end of the sleeve, peripheral longitudinal slots or grooves formed on the tube within the sleeve, pins carried by the sleeve coöperating in said slots or grooves, an exterior screw-threaded portion formed on the tube on the opposite projecting end thereof, a stationary interiorly-screw-threaded collar passed over the screw-threaded portion of the tube, a tool-holder carried by the tube on the side exterior to the collar, a cutter or knife movable freely in the tool-holder in a direction parallel to the shank of the cutter, a supporting-block forming a part of the cutter, an inclined groove formed on one of the surfaces of the block, a guide-rod passing through the tube and having one end firmly secured to the base of the cup, and the opposite end having an inclined section adapted to be embraced by the groove formed in the side wall of the block, the inclination of the section or inclined portion of the rod corresponding approximately to the inclination of the generatrix of the surface on which the screw-threads are to be cut, substantially as set forth.

4. In a screw-thread-cutting device, a suitable tool-holder, a tool-supporting block movable within the same in a direction parallel to the shank of the tool or cutter, a cutter adapted to be inserted in the block, a binding-bolt for securing the shank of the tool within the block, a screw-threaded socket formed in the shank of the tool or cutter, an adjusting-bolt passed into said socket, a head for the adjusting-bolt, a peripheral groove formed on said head, and suitable securing-plates carried by the upper surface of the block and having their curved edges passed into the groove of the head of the adjusting-bolt, the parts operating as and for the purpose set forth.

In testimony whereof I affix my signature in presence of two witnesses.

PAUL M. WIEBE.

Witnesses:
   EMIL STAREK,
   ALFRED A. MATHEY.